United States Patent
Pitts, Jr.

(10) Patent No.: US 9,625,608 B2
(45) Date of Patent: Apr. 18, 2017

(54) METHOD AND APPARATUS FOR DOWNHOLE SENSING USING NEUTRON PULSES AND GAMMA RADIATION MEASUREMENTS

(71) Applicant: Robert William Pitts, Jr., Houston, TX (US)

(72) Inventor: Robert William Pitts, Jr., Houston, TX (US)

(73) Assignee: AlphaNeutronics, Inc., Houston, TX (US)

( * ) Notice: Subject to any disclaimer, the term of this patent is extended or adjusted under 35 U.S.C. 154(b) by 0 days.

(21) Appl. No.: 13/694,919

(22) Filed: Jan. 22, 2013

(65) Prior Publication Data
US 2017/0082778 A1    Mar. 23, 2017

(51) Int. Cl.
*G01V 5/10* (2006.01)
*G01V 5/04* (2006.01)
*G01V 5/00* (2006.01)

(52) U.S. Cl.
CPC .............. *G01V 5/101* (2013.01); *G01V 5/00* (2013.01); *G01V 5/045* (2013.01)

(58) Field of Classification Search
CPC ........... G01V 5/101; G01V 5/045; G01V 5/00
USPC ..................... 250/269.6, 269.1, 269.4, 269.5
See application file for complete search history.

(56) References Cited

U.S. PATENT DOCUMENTS

| | | | | |
|---|---|---|---|---|
| 4,645,926 A * | 2/1987 | Randall | ............... | G01V 5/104 |
| | | | | 250/256 |
| 5,420,422 A * | 5/1995 | Loomis | ............... | G01V 5/107 |
| | | | | 250/269.1 |
| 7,102,125 B2 * | 9/2006 | Samworth | ............ | G01V 5/107 |
| | | | | 250/269.1 |
| 7,999,220 B2 * | 8/2011 | Odom | .................... | G01V 5/12 |
| | | | | 250/269.3 |
| 8,731,837 B2 * | 5/2014 | Mehta | ................... | E21B 47/00 |
| | | | | 702/106 |
| 2007/0252080 A1 * | 11/2007 | Truax | .................... | G01V 5/101 |
| | | | | 250/269.6 |

* cited by examiner

*Primary Examiner* — David Porta
*Assistant Examiner* — Meenakshi Sahu
(74) *Attorney, Agent, or Firm* — Hugh R. Kress

(57) ABSTRACT

A method and apparatus for characterizing the properties of the region surrounding a borehole. In one embodiment, a downhole tool including a neutron generator is used to generate neutron pulses into the region surrounding the borehole. A detector in the downhole tool detects gamma radiation pulses resulting from the capture of neutrons by elements in the surrounding region. For each gamma radiation pulse, a record is made of its amplitude and the time that the pulse was detected, measured to a resolution of a few microseconds. The amplitude/timestamp data is stored in memory in the tool for later retrieval. The data generated is stored in memory and interpretation can be made by the operator or log analyst after the memory module data has been transferred from the tool.

8 Claims, 3 Drawing Sheets

METHOD AND APPARATUS FOR DOWNHOLE SENSING USING NEUTRON PULSES AND GAMMA RADIATION MEASUREMENTS

FIELD OF THE INVENTION

The present invention relates generally to borehole well logging systems and methods, and more particularly relates to a method and apparatus for pulsed neutron capture borehole sensing.

BACKGROUND OF THE INVENTION

Borehole well logging systems that emit bursts of high energy radiation (neutrons) are routinely used in geophysical exploration for hydrocarbons. Some of the earliest commercial pulsed neutron logging systems differentiated between saline formation liquid from non-saline liquid, assumed to be hydrocarbon. Chlorine in saline water has a relatively large thermal neutron absorption cross-section, while carbon and hydrogen in hydrocarbons have relatively small thermal neutron cross-sections. The decay rate of thermal neutrons is measured between bursts of neutrons by measuring capture gamma radiation as a function of time. This decay rate is, therefore, indicative of the thermal neutron capture cross-section of the borehole environs. Those of ordinary skill in the art will recognize that this decay rate quantity is commonly referred to as "sigma" ($\Sigma$). See, e.g., U.S. Pat. No. 7,999,220 to Odom, entitled "Borehole Measurements Using a Fast and High Energy Resolution Gamma Ray Detector Assembly," which patent is hereby incorporated by reference herein in its entirety.

In the prior art, it is customary for the decay waveform (sigma) to be determined by defining a plurality of time intervals or "gates" during which periods the gamma radiation resulting from neutron capture in the borehole environment is detected. See, for example, U.S. Pat. No. 7,201,125 to Samworth, entitled "Method of Logging a Borehole," which reference is hereby incorporated by reference herein in its entirety. The output of the gamma radiation detector is integrated during these gating periods to recreate an analog waveform reflecting the measure of decay of the gamma radiation and hence of neutron capture in the formation. See also, U.S. Pat. No. 7,139,350 to Tiller et al., entitled "Method and Apparatus for Measuring Radiation in a Borehole," which reference is hereby incorporated by reference in its entirety. The Samworth '125 patent observes that by integrating the gamma radiation detector output over gating periods, "there is no need to detect and separate each individual detector pulse." (Samworth '125, col. 3, lines 19-21).

On the other hand, by limiting the analysis of the sigma curve to a limited plurality of gating periods, a less than complete picture of the actual decay curve can be attained.

SUMMARY OF THE INVENTION

In view of the foregoing, the present invention is directed to an improved method and apparatus for downhole logging using neutron capture techniques.

In accordance with one aspect of the invention, rather than defining gating periods, a system is provided for detecting each gamma particle pulse that is sensed during the relevant time periods and recording, for each such pulse, its amplitude and a real-time (time of day) time stamp of the time of detection.

In one embodiment of the invention, a neutron pulse generator is controlled to generate a neutron pulse every one millisecond (1 mSec).

During this time when the neutron pulse is generated inelastic gamma radiation is created. Each inelastic gamma ray detected represents a captured neutron which is recorded with amplitude and realtime stamped.

In accordance with another aspect of the invention, for a period of time following the carbon/oxygen window, logging of gamma pulses is discontinued. This accomplishes discrimination against detection of neutrons captured in the borehole itself. Following the borehole discrimination time, logging of time and amplitude of each gamma particle detected is resumed until generation of the next neutron pulse.

In accordance with another aspect of the invention, the time and amplitude data for detected gamma pulses is stored in memory within the downhole tool for later retrieval, such as after the tool has been returned to the surface. (Those of ordinary skill in the art will appreciate that the amount of data involved may make it impractical to transmit the data using the telemetry link of the tool.)

The present invention distinguishes itself from the prior art inasmuch as it provides a comprehensive record and logging of detected gamma pulses, enabling the operator obtain more precise data than with prior art "gating" techniques. The sigma curve can be recreated from the logged data with far greater resolution than with traditional "gating" methodologies. Moreover, the data is available at any time after being retrieved from the tool, enabling the operator to recreate the logging operation and process the logging data in various ways whenever desired.

BRIEF DESCRIPTION OF THE DRAWINGS

The present invention is best understood with reference to the following detailed description of embodiments of the invention when read in conjunction with the accompanying drawings, in which.

DETAILED DESCRIPTION OF A PREFERRED EMBODIMENT OF THE INVENTION

In the disclosure that follows, in the interest of clarity, not all features of actual implementations are described. It will of course be appreciated that in the development of any such actual implementation, as in any such project, numerous engineering and technical decisions must be made to achieve the developers' specific goals (e.g., compliance with system and technical constraints), which will vary from one implementation to another. Moreover, attention will necessarily be paid to proper engineering practices for the environment in question. It will be appreciated that such development efforts might be complex and time-consuming, outside the knowledge base of typical laymen, but would nevertheless be a routine undertaking for those of ordinary skill in the relevant fields.

Figure 1:
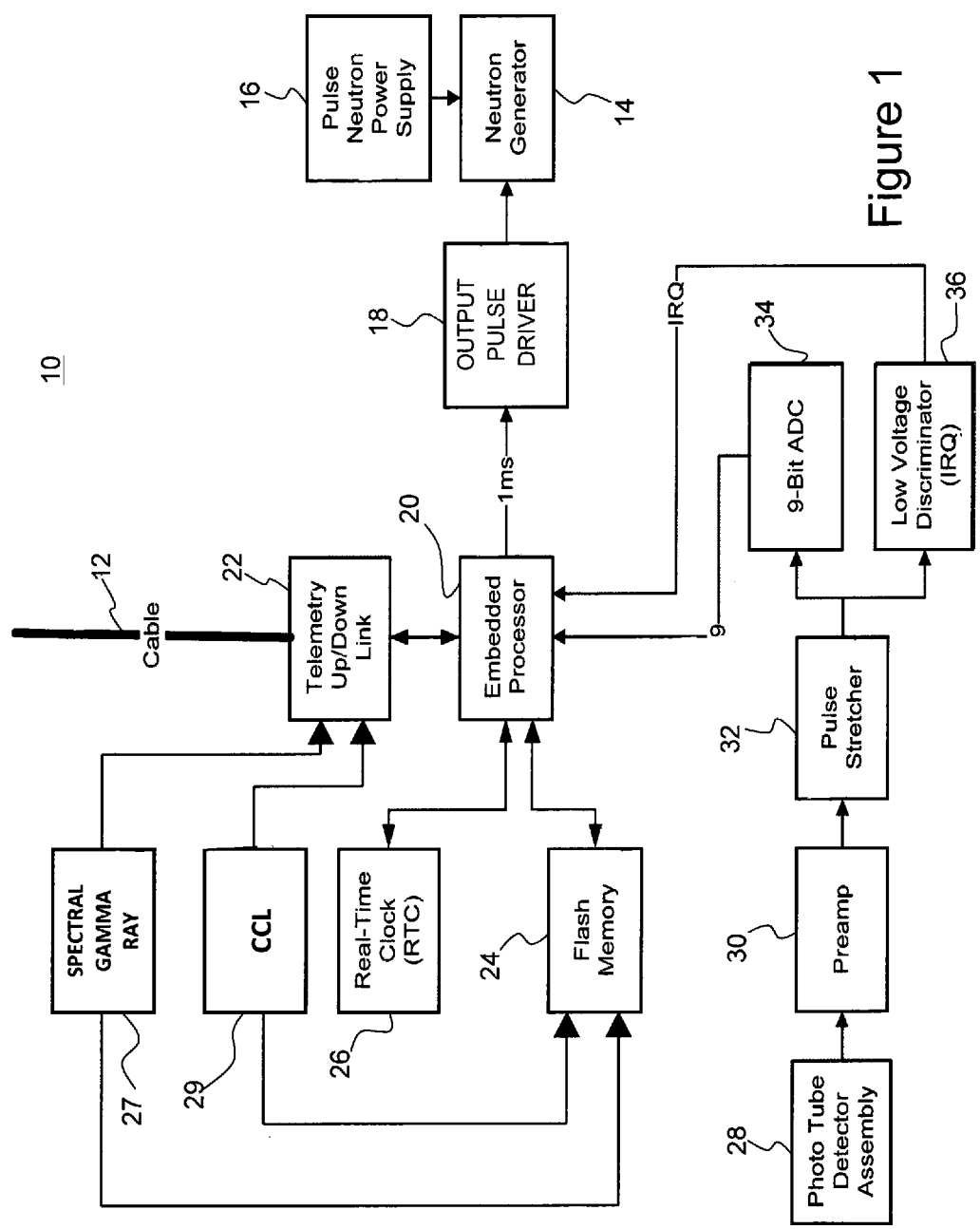
FIG. 1 is a functional block diagram of a downhole measurement/sensing tool in accordance with one embodiment of the invention.

Referring to FIG. 1, there is shown a functional block diagram of a logging tool 10 implemented in accordance with a presently preferred embodiment of the invention. As represented in FIG. 1, tool 10 is adapted to be raised and lowered through a borehole by attachment to a cable 12, in accordance with conventional practice.

As shown in FIG. 1, logging tool 10 includes a neutron pulse generator 14 for generating neutron pulses into the borehole environment. Neutron pulse generator 14 has an associated power supply 16 and is triggered to generate neutron pulses by a neutron pulse driver 18. These components of tool 10 are conventional in design, and can be readily implemented by those of ordinary skill in the art without any undue experimentation.

Preferably, tool 10 includes an embedded microprocessor 20 for controlling functionality as described herein. In one embodiment of the invention, processor 20 is a 16-bit microprocessor, although those of ordinary skill in the art will appreciate that numerous options are available depending upon individual preferences and requirements. A telemetry link 22 may be provided for communication with the surface via cable 12.

Associated with processor 20 is a memory module 24, which in one embodiment of the invention comprises flash memory, but which could conceivably comprise any appropriate form of persistent digital storage, as would be apparent to those of ordinary skill in the art having the benefit of this disclosure. Also associated with processor 20 is a real-time clock circuit 26 enabling events to be time-stamped in real time, as will be hereinafter described in further detail.

With continued reference to FIG. 1, logging tool 10 includes a photomultiplier tube detector assembly (scintillator crystal) 28 for detecting gamma rays. In one embodiment, the detector consists of a CsI, sodium iodide, $LaBr_3$ detector, or any solid state device capable of detecting particle energy Those of ordinary skill in the art will appreciate that a scintillator crystal is a crystal which is transparent in the scintillation wavelength range, which responds to incident radiation by emitting a light pulse. From such crystals, it is known to fashion detectors in which the light emitted by the scintillator crystal is detected by a light detecting means, thereby producing electrical signals when light pulses are received. Those of ordinary skill in the art will be very familiar with such detecting mechanisms and their operation.

The output of the detector assembly 28 is provided to a preamplifier 30 and a pulse stretcher 32 before being fed to the input of and analog-to-digital converter (ADC) 34 and to a low voltage discriminator 36. In the presently disclosed embodiment, ADC 34 converts voltage pulses to a nine-bit binary value, which is then communicated to processor 20 as shown in FIG. 1. At the same time, low voltage discriminator 36 functions to generate an interrupt (IRQ) signal to processor 20 whenever certain conditions are met, as will be described below with reference to FIG. 2.

Those of ordinary skill in the art will appreciate that tools such as tool 10 operate by first delivering a pulse of high energy neutrons into the formation surrounding the borehole, in order that the capture of neutrons by elements in the formation can be detected by detector assembly 28 as previously described, thereby facilitating the characterization of the formation's makeup based upon the nature of the neutron capture processes.

With continued reference to FIG. 1, and in accordance with one embodiment of the invention, downhole tool 10 is preferably provided with a second, separate gamma ray detector 27, located at the top of the tool, as is customary. The second gamma ray detector 27 is used to tell the operator the stratigraphy of the borehole with respect to the depths at which sands and shales are located, as would be familiar to those of ordinary skill in the art. Unlike the output of the primary detector assembly 28, which is processed and time-stamped, the output of the second gamma radiation detector is telemetered directly to the operator at the surface.

Preferably, the operator does not want to record neutron pulse data or other tool measurements in zones (depths) that cannot produce hydrocarbons. Hence, the second gamma radiation detector measures the gamma ray spectrum transmits this data to the surface via telemetry link 22. This will enable the operator to turn on the neutron pulse section of tool 10 only in desired zones, i.e., at desired depths. If the tool 10 is run on batteries and a slickline, the operator can program the tool to log neutron pulses at set times and the operator will position the tool in those zones that are desirable. The operator may know from previous log runs the locations of the zones of interest. The logging tool 10 can be programmed using real-time clock 26 to turn on and off at preset times. It is then up to the operator to have the tool in the desired location at the prescribed time intervals.

It is to be noted from FIG. 1 that second gamma ray detector 27 is not only coupled to telemetry link 22, but also to flash memory unit 24. This allows the gamma ray spectral data to be stored along with the other logging data, thereby providing and even more complete logging record.

Finally, as shown in FIG. 1, tool 10 is preferably provided with a casing collar locator (CCL) 29, also coupled to telemetry link 22 and flash memory unit 24.

Figure 2:
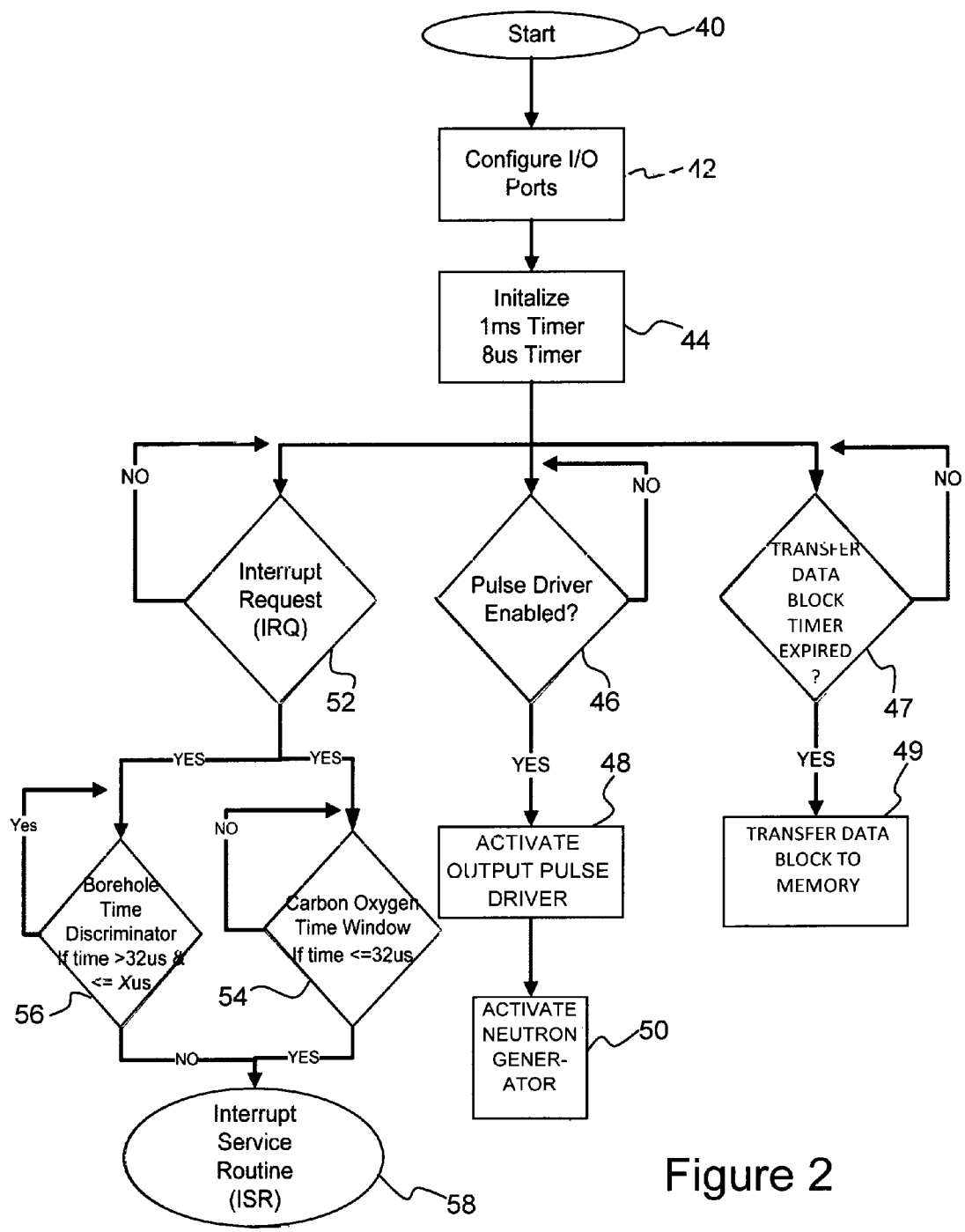
FIG. 2 is a flow diagram representing the operation of the tool from FIG. 1 in accordance with one implementation of the invention.

Turning now to FIG. 2, there is shown a flow diagram illustration operation of tool 10 in accordance with the presently disclosed embodiment of the invention. It is to be understood that the functionality described herein with respect to tool 10 is largely carried out through the programming of processor 20 in tool 10, with the cooperation of external devices as herein described. Proper programming of a tool such as tool 10 to perform the steps described herein is believed to be a matter of routine engineering to those of ordinary skill in the art.

As shown in FIG. 2, the process is initiated as shown by block 40 with appropriate commands and signals to processor 20. This causes processor 20 to configure its input/output (I/O) ports appropriately, in block 42, and activate certain timers (block 44). In the presently disclosed embodiment of the invention, timers with a one-millisecond (1 mSec) period and an eight-microsecond (8 μec) period are employed, as will be hereinafter described.

Following initialization in steps 40, 42, and 44, processor 20 then enters a responsive state in which it continuously monitors certain conditions, and takes appropriate actions upon their occurrence. This is a conventional sort of programming of an embedded processor believed to be understood by anyone of ordinary skill in the art.

One example is represented by decision block 46 in FIG. 2, which represents the processor 20 monitoring, on a continuous basis, whether neutron pulse driver 18 from FIG. 1 is enabled. If not, as shown in FIG. 2, no action is taken and processor 20 goes back into its responsive state with respect to this condition. On the other hand, pulse driver 18 is enabled every one millisecond (1000 times per second) to generate a neutron pulse, whose duration may be, for example, approximately 32 μSec (microseconds) in duration. This duration is referred to as the carbon/oxygen time window.

When, at decision block 46, it is determined once every one millisecond that pulse driver 18 is to be enabled, process flow proceeds to block 48 in FIG. 2, where output pulse driver 18 is enabled. This leads to block 50, where neutron generator 14 is activated, as represented by block 50 in FIG. 2 to generate a neutron pulse of, for example, 32 µSec duration.

Simultaneously with the foregoing, processor 20 is continuously monitoring the occurrence of interrupt requests (IRQs) from low voltage discriminator 36 (FIG. 1). Low voltage discriminator 36 generates and IRQ whenever a pulse from pulse stretcher 32 is received which exceeds a predetermined minimum amplitude. Each such pulse reflects the detection of a thermal neutron generated gamma particle by detector assembly 28, amplified by preamplifier 30 and fed to pulse stretcher 32.

Referring again to FIG. 2, when an IRQ is generated by low voltage discriminator 36, decision block 52 directs process flow to decision blocks 54 and 56. Decision block 54 represents the carbon/oxygen time window, which corresponds to the time during which the neutron pulse is being generated. In the illustrative example, the neutron pulse duration is 32 µSec, although those of ordinary skill in the art will appreciate that this duration could be varied in different implementations.

Figure 3:
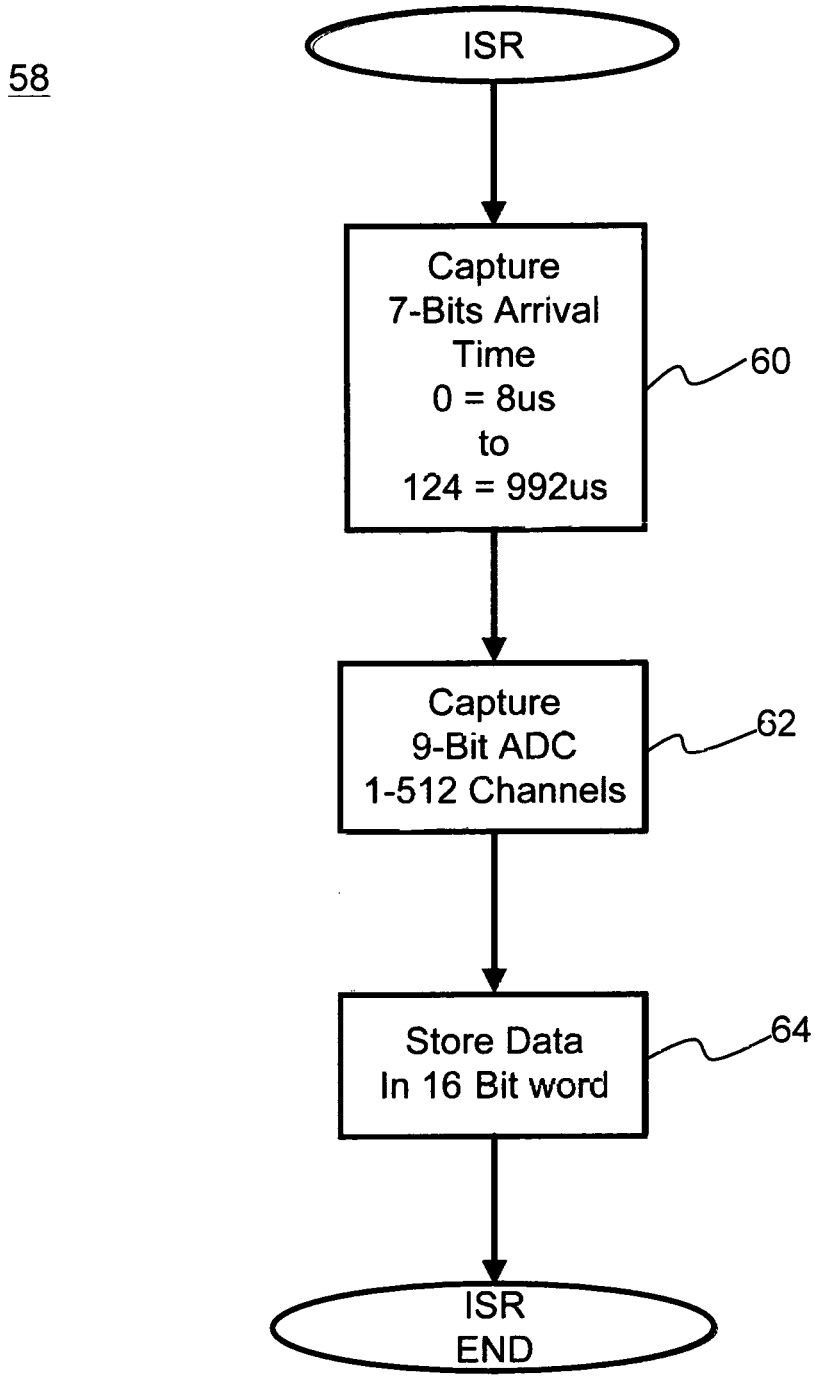
FIG. 3 is a flow diagram representing the operations performed for an interrupt service routine from the process depicted in FIG. 2.

During the carbon/oxygen time window, decision block 54 causes process flow to lead to block 58, which corresponds to the execution of an interrupt service routine (ISR), shown in the flow diagram of FIG. 3. That is to say, for each gamma radiation pulse detected during the carbon/oxygen time window, decision block 54 leads to the execution of the ISR 58, whereby a timestamp and amplitude record is made of the detected pulse.

With reference now to FIG. 3, each time the ISR 58 is invoked, a first step represented by block 60 is to capture an arrival time for the detected gamma particle. In the presently disclosed embodiment, the arrival time is measured to a resolution of 8 µSec, based on the 8 µSec clock initialized in block 44 of FIG. 2. This enables the arrival time to be stored in seven binary bits. Those of ordinary skill in the art will readily understand that the 8 µSec resolution is exemplary only, and this resolution can be increased or decreased in different implementations based on various system constraints, including clock speeds and memory capacity.

Next, in block 62, the amplitude of the detected gamma ray pulse is captured from the analog-to-digital converter (ADC) 34. In the illustrative embodiment, ADC presents a nine-bit value of the amplitude, although again it is to be understood that this resolution could be increased or decreased in different implementations of the invention. This means that for each gamma particle pulse detected by detector 28, a sixteen-bit word consisting of a seven-bit timestamp and a nine-bit amplitude value is recorded. The recording of these values is reflected by block 64 in FIG. 3, and the data itself is stored in flash memory 24 (FIG. 2). This completes the ISR 58, which is invoked for each gamma particle pulse passing through low-voltage discriminator 36, FIG. 1.

The foregoing has described what occurs during the carbon/oxygen time window (32 µSec in the exemplary embodiment). Following expiration of this window, and with reference again to FIG. 2, this calls into play decision block 56, which represents a borehole time discriminator. "Borehole time" refers to the time period during which neutrons are captured in the borehole (including casing), which is not a period of interest, as any neutron capture is occurring in the borehole or casing and does not reflect the makeup of the area surrounding the borehole. Consequently between 32 µSec (i.e., termination of the neutron pulse) and a predetermined time XµSec, decision block 56 will not invoke ISR 58. In one embodiment, X=400 µSec, for example, although those of ordinary skill in the art will recognize that this value will vary depending upon a number of factors, including borehole diameter.

Following expiration of the borehole discrimination time interval X, however, and with continued reference to FIG. 2, decision block 56 will once again begin invoking ISR 58 for each gamma particle pulse detected. This occurs from time (T)=XµSec until time T=1000 µSec, such that a complete record of captured neutrons outside of the borehole is compiled before another neutron pulse is delivered, based on the one-millisecond timer.

With continued reference to FIG. 2, a final process implemented by processor 20 relates to the transfer of the neutron pulse data to flash memory 24. In one embodiment, gamma radiation data and timestamps are generated as described herein, this information is initially stored in a RAM buffer in or associated with embedded processor 20. Periodically, it is necessary to transfer the contents of this buffer to the (much larger) memory unit 24. To this end, a timer or timer function is provided (transfer timer) for interrupting the processor 20 to transfer the neutron pulse data from its buffer to memory 24. As reflected in block 47 in FIG. 2, when this timer times out, for example, once every 100 msec, as reflected by block 49 in FIG. 2 the timestamps and data (a data block) is transferred to memory 24.

At least one embodiment of the invention has been described herein solely for the purposes of illustrating the invention in its various aspects. It is contemplated and to be explicitly understood that various substitutions, alterations, and/or modifications, including but not limited to any such implementation variants and options as may have been specifically noted or suggested herein, including inclusion of technological enhancements to any particular method step or system component discovered or developed subsequent to the date of this disclosure, may be made to the disclosed embodiments of the invention without necessarily departing from the technical and legal scope of the invention as defined in the following claims.

What is claimed is:

1. A method of measuring properties of a formation surrounding a borehole, comprising:
   (a) directing a neutron burst into the formation;
   (b) detecting gamma radiation pulses resulting from the capture of neutrons by elements in the formation;
   (c) for each detected gamma radiation pulse, recording a time value and a pulse amplitude value.

2. A method in accordance with claim 1, wherein said time values and amplitude values are recorded in individual binary words stored in a memory contained in a downhole instrument.

3. A method in accordance with claim 1, further comprising:
   (d) sending gamma radiation data to an operator at the surface, whereby said operator can control the timing of delivery of neutron bursts.

4. A method in accordance with claim 1, wherein said step (b) of detecting gamma radiation pulses comprises:
   (b)(1) preamplifying the output of a gamma ray detector assembly; and
   (b)(2) applying said preamplified output to a low voltage discriminator.

5. A downhole logging tool for characterizing the region surrounding a borehole, comprising:
   a neutron generator for generating neutron pulses into the region surrounding the borehole;
   a gamma radiation detector for detecting gamma particles resulting from said neutron pulses, the time and amplitude of said gamma radiation being known to reflect the elemental composition of the region surrounding the borehole;
   wherein for each gamma particle detected during preselected time windows following delivery of a neutron pulse, said tool records a timestamp and amplitude data for said detected gamma particle.

6. A downhole tool in accordance with claim 5, further comprising:
   a processor for controlling operations of the tool; and
   a real-time clock.

7. A downhole tool in accordance with claim 6, further comprising:
   a memory circuit for storing said timestamp and amplitude data.

8. A downhole tool in accordance with claim 5, further comprising:
   a second gamma radiation detector for detecting gamma particles from the region surrounding the borehole; and
   a telemetry unit for transmitting output from said second gamma radiation detector to an operator on the surface;
   wherein said operator controls delivery of neutron pulses by said downhole tool based in part on the output of said second gamma radiation detector.

* * * * *